United States Patent [19]

Suzuki et al.

[11] Patent Number: 4,909,961

[45] Date of Patent: Mar. 20, 1990

[54] ELECTRIC CONDUCTIVE AND SLIDING RESIN MATERIAL

[75] Inventors: Osamu Suzuki, Toyota; Eizi Asada, Okazaki; Tatsuhiko Fukuoka, Aichi, all of Japan

[73] Assignee: Taiho Kogyo Co., Ltd., Toyota, Japan

[21] Appl. No.: 307,818

[22] Filed: Feb. 8, 1989

Related U.S. Application Data

[60] Division of Ser. No. 101,235, Sep. 24, 1987, Pat. No. 4,830,777, which is a continuation of Ser. No. 870,281, May 23, 1986, Pat. No. 4,698,179, which is a continuation of Ser. No. 645,365, Aug. 29, 1984, abandoned.

[30] Foreign Application Priority Data

| Aug. 31, 1983 [JP] | Japan | 58-158092 |
|---|---|---|
| Aug. 31, 1983 [JP] | Japan | 58-158093 |
| Aug. 31, 1983 [JP] | Japan | 58-158094 |

[51] Int. Cl.[4] .............................................. H01B 1/06
[52] U.S. Cl. ...................................... 252/511; 252/502; 524/495; 524/496

[58] Field of Search .................. 252/502, 510, 511; 524/404, 451, 493, 594

[56] References Cited

U.S. PATENT DOCUMENTS

| 4,687,598 | 8/1987 | Varma | 252/511 |
|---|---|---|---|
| 4,690,778 | 9/1987 | Narumiya et al. | 252/511 |
| 4,698,179 | 10/1987 | Suzuki et al. | 252/511 |
| 4,702,859 | 10/1987 | Shimizu et al. | 524/495 |
| 4,728,461 | 3/1988 | Fugii et al. | 252/511 |
| 4,791,016 | 12/1988 | Schulte et al. | 524/495 |
| 4,828,755 | 5/1989 | Kusumgar et al. | 252/511 |
| 4,830,777 | 5/1989 | Suzuki et al. | 252/511 |

*Primary Examiner*—Josephine Barr
*Attorney, Agent, or Firm*—Armstrong, Nikaido, Marmelstein, Kubovcik & Murray

[57] ABSTRACT

The present invention proposes a thermoplastic resin material having both good characteristics and a high electric conductivity and comprising (a) graphite and carbon black, (b) graphite, carbon black, and lubricating oil, (c) carbon black and lubricating oil, or (d) fluorine resin in addition to (a)-(c).

5 Claims, 9 Drawing Sheets

ELECTRIC CONDUCTIVE AND SLIDING RESIN MATERIAL

This is a division of application Ser. No. 101,235, filed September 24, 1987, now U.S. Pat. No. 4,830,777, which is a continuation of U.S. Ser. No. 870,281, filed May 23, 1986, now U.S. Pat. No. 4,698,179, which in turn is a continuation of application Ser. No. 645,365, filed August 29, 1984, now abandoned.

BACKGROUND OF THE INVENTION

1. Field of the Invention

The present invention relates to electric conductive and sliding resin material. More particularly, the present invention relates to resin material to which both sliding characteristics and electric conductivity are imparted so that the material can be used as a cassette reel of a VTR, a rotary member for paper feeding in a copy machine, and parts of other business and electronic machines.

2. Description of the Prior Art

Recently, demands for VTRs have been rapidly increasing, and the employment of antistatic resin as cassette reels has greatly contributed to the spreading of and quality enhancement of VTRs since it prevents the occurrence of electric discharge in the cassette reels during the running period of a tape, in which period static electricity is liable to be generated due to friction between the tape and the cassette reels or due to the peeling off of the tape, thereby exerting an adverse effect on the appearance of the VTR. In addition, during the rotation of a reel plate which is integrally rotated with a pulley driven by a belt, the reel plate is electrically charged due to friction between the belt and the pulley and then the electric charge is discharged into the ICs of the VTR via the reel plate, with the result that failure of the VTR occasionally occurs. This failure can be prevented by the employment of antistatic resin.

Furthermore, in electrostatic-type copy machines, the plastics presently used for bearing or supporting paper-feeding rollers can be charged by the static electricity of the charged paper, with the result that such problems as copy unevenness, inaccurate paper feeding due to the adhesion of paper to the paper-feeding roller, and discharge of an electric charge from the paper-feeding roller can arise. These problems can be solved by providing a copy machine with an antistatic means or a mechanism for peeling off paper adhered on the paper-feeding roller. However, when this is done, since a copy machine mechanism and means are complicated, the reliability of the copy machine is lessened and the weight and cost thereof are increased.

Macromolecular materials, such as plastics, usually have a volume resistivity of $10^{14}$ $\Omega$·cm or more. Thus, an electric charging phenomenon is very liable to be generated in macromolecular materials due to friction or the like. When an electric charging phenomenon is generated, dust is adsorbed on the macromolecular materials or an electric impact is imparted to the macromolecular materials. An antistatic agent is therefore blended with the macromolecular materials when a measure against dust adsorption is necessary.

Commercially available antistatic macromolecular materials are not satisfactory for use as the reel plate of a VTR since, in order to improve the appearance, not only do the components need to be antistatic but they also need to be highly electric conductive so that the electric charge is shunted to the ground.

In order to provide plastic materials which have a high resistance against electromagnetic interference, as in the case of plastic materials used as housings of electronic devices such as microcomputers and VTRs, an electric conductivity needs to be imparted thereto.

Known methods for imparting electric conductivity to macromolecular materials, such as plastics, are: (1) the incorporation of conductive carbon particles thereinto, (2) the incorporation of metal powder or metal fiber thereinto, (3) the incorporation of carbon fiber thereinto, and (4) the metallization thereof.

The metallization method (4) can be used for the housings of electronic devices and for ICs but cannot be used for sliding members, such as bearings, rollers, and the like. If the metal-fiber or metal-powder incorporating method (2) and the carbon-fiber incorporating method (3) are employed in the production of the sliding members to enhance their electric conductivity, flaws may disadvantageously be formed on their opposite members. In addition, when the sliding members, into which carbon fibers are incorporated, are subjected to friction over a long period of time, their coefficient of friction disadvantageously increases.

Method (1) is described in U.S. Pat. Nos. 3,823,217, 3,243,753, 3,823,217, and 3,861,029.

In method (1), carbon blacks are used as conductive carbon particles since the volume resistivity of the carbon blacks is lower than that of other carbonaceous materials. Although the electric conductivity is enhanced by the carbon blacks, the sliding characteristics are so impaired as compared with macromolecular materials free of carbon blacks that macromolecular materials containing carbon blacks cannot be used as bearings.

Sliding resin materials containing graphite powder are known from, for example, U.S. Pat. No. 4,302,379 and GBP No, 1,069,919.

GBP No. 1,044,028 discloses a sliding resin material containing metal oxide, carbon black, or silica as an inert filler.

SUMMARY OF THE INVENTION

It is an object of the present invention to provide a resin material having both an improved electric conductivity and improved sliding characteristics.

It is another object of the present invention to provide a resin material having not only an antistatic characteristic but also a conductive characteristic which enables the conduction of current therethrough and shunting of the current, if necessary, to the ground.

It is a further object of the present invention to provide a sliding or rotary member of a business machine, an electronic machine, or the like which has a high electric conductivity and improved sliding characteristics.

In accordance with the objects of the present invention, there is provided a conductive and sliding resin material having an improved electric conductivity and improved sliding characteristics and comprising a thermoplastic resin, characterized by dispersing carbon black and graphite in the thermoplastic resin. Lubricating oil can be additionally incorporated into the thermoplastic resin according to the present invention.

In accordance with the objects of the present invention, there is also provided a conductive and sliding resin material having an improved electric conductivity and improved sliding characteristics and comprising a thermoplastic resin, characterized dispersing carbon black in the thermoplastic resin and by incorporating lubricating oil into the thermoplastic resin.

Thermoplastic Resin

The thermoplastic resin can be any resinous material having thermoplastic properties but is preferably at least one selected from the group consisting of polyphenylene oxide, polyphenylene sulfide, polybutylenephthalate, polyamide, polycarbonate, and polyacetal. In the case of polyacetal, either copolymer-type polyacetal or homopolymer-type polyacetal can be used as the thermoplastic resin, but copolymer-type polyacetal is preferred.

Graphite

Graphite enhances the sliding characteristics of the thermoplastic resin. When the sliding material according to the present invention contains carbon black, the sliding characteristics tend to be impaired. However, the impaired sliding characteristics are compensated for by the graphite, and, consequently, the sliding characteristics are superior to those of a thermoplastic resin free of carbon black. The graphite is therefore preferably dispersed at least in a minor but effective amount for enhancing the sliding characteristics of the thermoplastic resin, into which carbon black is incorporated.

Graphite has a volume resistivity $10^{-10}$ times or more as low as that of resin materials. Nevertheless, if graphite alone is incorporated into the thermoplastic resin, the electric conductivity of the sliding materials cannot be appreciably enhanced at a graphite content of 40% or more by weight. However, in sliding materials in which graphite and carbon black are copresent, when only a small amount of graphite is incorporated, the electric conductivity is remarkably enhanced due to the synergistic effect of the graphite and the carbon black.

The incorporated amount of graphite preferably does not exceed 40% by weight so that the strength of the sliding materials is not lessened. If the strength of the sliding materials is lessened, the sliding characteristics thereof are deteriorated due to the deformation thereof, a reduction in the fatigue strength, or the like. In other words, due to the synergistic effect of the graphite and the carbon black the electric conductivity of the sliding materials is high but the strength of the sliding materials is very low at a high content of graphite. Therefore, in the light of the sliding characteristics, the content of graphite is preferably 30%, more preferably 25% and still more preferably 15%, by weight or less. The lowest incorporated amount of graphite which appreciably improves both the electric conductivity and the sliding characteristics is 3% by weight. When such amount is 20% by weight, desirable sliding characteristics and a considerably high electric conductivity can be attained by adjusting the other components of the sliding materials.

The graphite is one member selected from the group consisting of natural graphite and synthetized graphite but preferably is synthetized graphite. The natural graphite is soil graphite, flaky graphite, or other types of graphite found in nature. The synthetized graphite is obtained by heating and crystallizing amorphous carbonaceous material obtained from coal, petroleum, coke, or the like. Synthetized graphite is preferred since the wear amount of sliding materials containing synthetized graphite is as small as approximately one tenth that of sliding materials containing natural graphite. The wear amount is one of the indices of the sliding characteristics. The other indices are a low and stable coefficient of friction, the load capacity, the lubricating characteristic, and uniform wear, as is described hereinbelow. The graphite can be in the form of particles, fibers, needles, frakes or the like. The grain size of the graphite is not specifically limited but is generally 150 $\mu$m or less preferably 100 $\mu$m or less, more preferably 50 $\mu$m or less. A minimum size of the graphite is preferably 1 micron in the light of the sliding characteristics.

Carbon Black

Carbon black imparts an electric conductivity to the sliding materials. Therefore, carbon black is incorporated at least in a minor but effective amount for enhancing the electric conductivity of the thermoplastic resin. The amount of carbon black is preferably from 7% to 30% by weight when sliding materials having a considerably high electric conductivity are to be provided. The amount of carbon black is preferably from 3% to 10% by weight when sliding materials having satisfactory sliding characteristics are to be provided. When the amount of carbon black is from 7% to 10% by weight, both the sliding characteristics and the electric conductivity are excellent. The kind of carbon black is not specifically limited but is preferably acetylene black, produced by carbonizing acetylene, and more preferably is a special furnace-type carbon black consisting of ultrafine particles 10 Å or less in size and commercially available under the trade name of Ketchen Black.

Lubricating Oil

Lubricating oil imparts lubricating characteristics to the sliding materials. Since current is conducted through the sliding materials according to the present invention, the sliding materials themselves should have sliding characteristics. That is, if lubricating oil must be supplied to the bearing surface from an oil supplying mechanism of, for example, a copy machine, not only do such disadvantages as short circuiting occur but also stable and long-term operation of the copy machine cannot be ensured. The lubricating oil is preferably incorporated at least in a minor but effective amount for enhancing the lubricating characteristics of the sliding materials. The lubricating oil can be impregnated into at least either the graphite or the carbon black. In this case, the electric conductivity enhancement due to the graphite and carbon black is lessened, but the lubricating oil can be stably retained in the sliding materials. Alternatively, the lubricating oil can be impregnated into the thermoplastic resin material. In this case, the electric conductivity of the sliding materials is high since the electric conductivity of the graphite and carbon black is not lessened due to the lubricating oil impregnation. The lubricating oil can be impregnated into the thermoplastic resin and into either the graphite or the carbon black or both.

The kind of lubricating oil is not specifically limited but is preferably one having a heat resistance of up to 250° C. The lubricating oil can be an ordinary one but is preferably jet engine oil having a heat resistance of up to 180° C.

The amount of lubricating oil is 10% or less by weight, preferably from 1.5% to 3% by weight.

Fluorine Resin

The thermoplastic resin comprises, in addition to at least one member selected from the group consisting of polyphenylene oxide, polyphenylene sulfide, polybutylenephthalate, polyamide, polycarbonate, and polyacetal, a fluorine plastic, preferably polytetrafluoroethylene (PTFE). The fluorine plastic further improves the sliding characteristics improved by the graphite and/or lubricating oil. More specifically, when sliding materials containing a fluorine plastic are worn out nonuniformly, with the result that their contact surface with the opposite member becomes nonuniform or they slide against one another while making contact only at local portions, further local wear is suppressed.

The fluorine plastic is present in the sliding materials preferably in a finely-divided form since a finely-divided fluorine plastic can improve the sliding characteristics. In other words, although the fluorine plastic itself is not highly wear resistant, when it is incorporated into sliding materials it effectively suppresses local wear. The minimum grain size of a finely-divided fluorine plastic which can effectively suppress local wear is from 7 to 8 $\mu$m. In this case, the volume resistivity of the sliding materials is approximately $10^3$ $\Omega$·cm, and, therefore, the electric conductivity property is comparable to that of conventional macromolecular materials containing carbon black. The finely-divided fluorine plastic is preferably 25 $\mu$m or more in size in order to provide the sliding materials with excellent sliding characteristics. The amount of fluorine plastic is usually 5% by weight or less. When the fluorine plastic is 25 $\mu$m to 40 $\mu$m in size, the amount of fluorine plastic can be 6% by weight or less.

Copresence of the Components of the Sliding Materials

Carbon black tends to increase the coefficient of friction and to lessen the load capacity. Such a tendency is suppressed by graphite. The load capacity is a property of sliding materials which resists the load. If the load capacity is low, the sliding materials are usually destroyed due to the load applied thereto by the opposite member. And even if they are not destroyed, fatigue of the sliding material is liable to occur, thereby deteriorating the sliding characteristics.

Fluorine resin, for example, PTFE, is heat-resistant but is not wear-resistant. However, when fluorine resin is copresent with one or more components of sliding materials, it suppresses local wear of the sliding materials. Fluorine resin slightly decreases the electric conductivity. That is, the copresence of fluorine resin and one or more components of the sliding materials is not advantageous for the electric conductivity of the sliding materials. It seems that, since the fluorine resin particles are present between the carbon black, the electric conductivity is lessened. Not only the carbon black but also the graphite impart an electric conductivity to the sliding materials according to the present invention, and a high electric conductivity is provided even at a minor amount of carbon black due to the synergistic effect of the graphite and the carbon black.

Lubricating oil tends to decrease the electric conductivity. When lubricating oil is impregnated into the thermoplastic resin, the electric conductivity of the sliding materials is basically determined by that of the graphite and/or carbon black and is high.

Process for Producing the Sliding Materials

The components of the sliding materials according to the present invention are prepared so that they have a predetermined grain size and weight proportions. After mixing, an appropriate amount of a coupling agent and an appropriate amount of a viscosity-adjusting agent are incorporated into the mixture. The mixture is extruded with a kneader to form pellets, and the pellets are shaped into a predetermined shape.

When a lubricating oil is to be impregnated into the graphite and/or the carbon black, then are stirred in the lubricating oil.

The maximum amount of components is limited to enable the mixing of the components with each other. For example, approximately 40% by weight of graphite can be mixed with the other components. In this case, since the strength of the sliding materials is low, the sliding materials must be used for a part not exposed to a high mechanical load.

A preferable maximum amount of components is 40% by weight (in total) since the strength of the sliding materials is lessened at more than 40%.

The present invention is hereinafter explained with reference to the drawings.

PROPERTIES OF SLIDING MATERIALS

Figure 1:
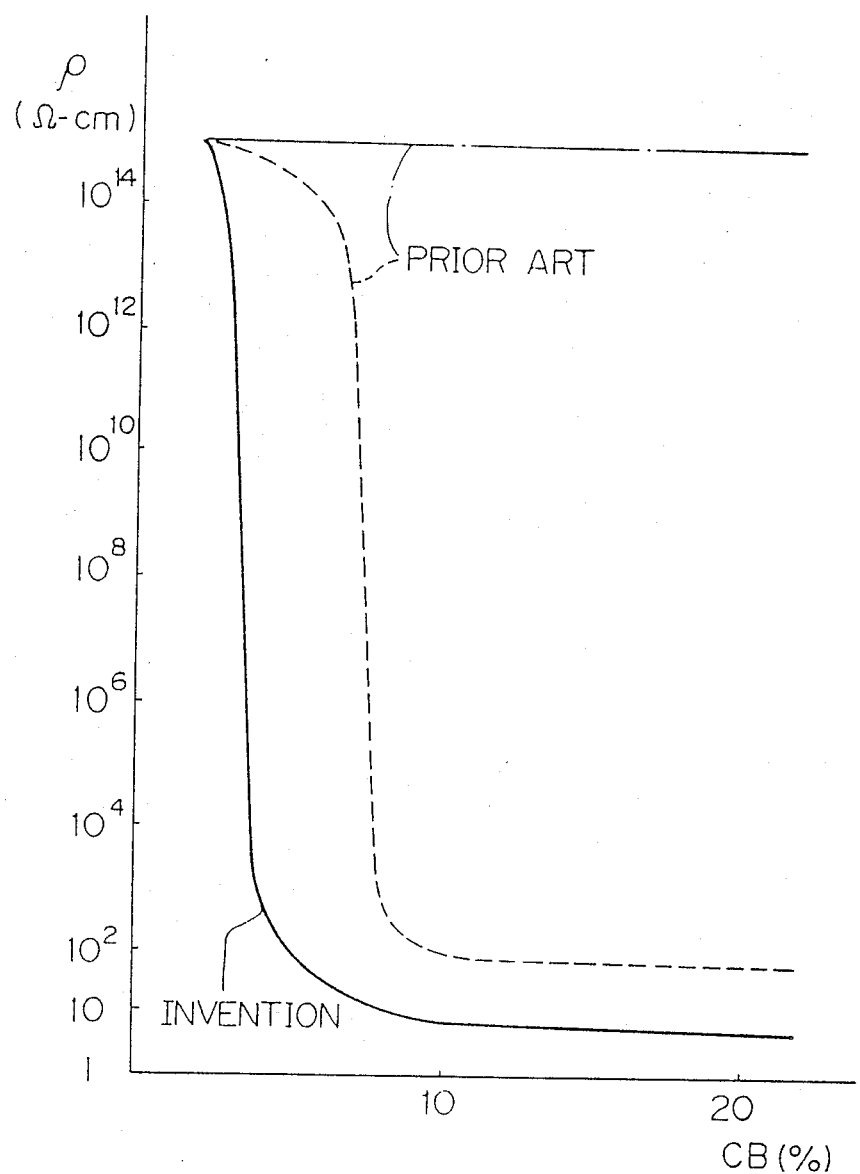
FIG. 1 shows the relationship between the volume resistivity and the carbon black amount of sliding materials containing graphite particles and carbon black particles according to the present invention and the relationship therebetween of conventional conductive resin materials.

Referring to FIG. 1, the solid-line curve indicates the volume resistivity of the sliding materials according to the present invention containing 20% by weight of graphite particles, 4% by weight of PTFE, and a percentage of carbon black particles (CB) (indicated by the abscissa), the balance being polyacetal resin. The volume resistivity of conventional conductive resin materials containing a percentage of carbon black particles (CB) (indicated by the abscissa) lies between the broken-line curve and the horizontal line.

The volume resistivity was measured by the method for measuring the resistivity of resins, stipulated under JIS K6911.

As is clear from FIG. 1, the volume resistivity is lessened due to the copresence of the graphite particles and the carbon black particles.

Figure 2:
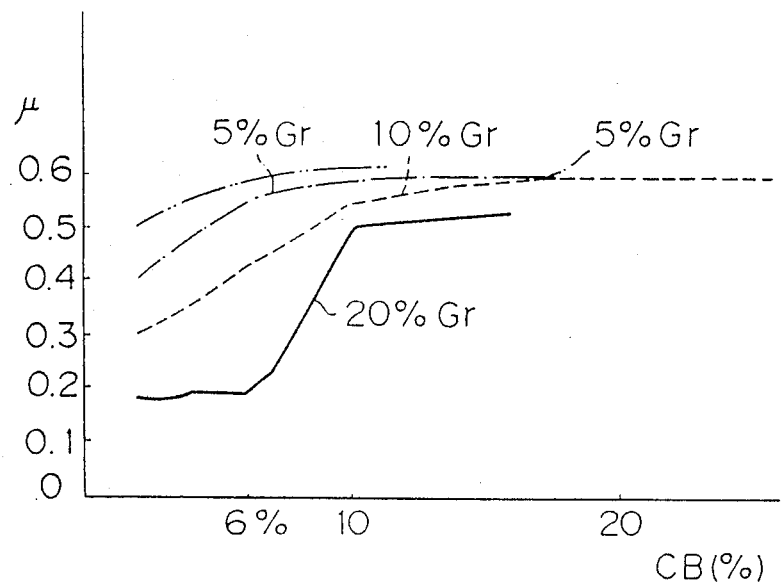
FIG. 2 shows the relationship between the coefficient of friction ($\mu$) and the amount of carbon black particles (CB) of sliding materials containing 20% or 5% by weight of graphite particles (Gr), 2% by weight of lubricating oil, 4% by weight of PTFE, and a percentage of carbon black (CB) (indicated by the abscissa), the balance being polyacetal resin.

Referring to FIG. 2, it is apparent that the carbon black particles tend to increase the coefficient of friction (μ), but such a tendency is mitigated by the graphite particles.

Figure 3:
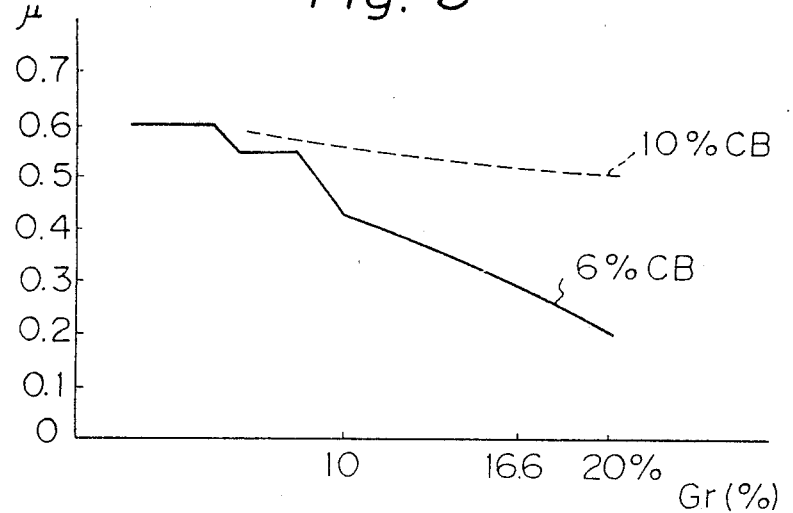
FIG. 3 shows the relationship between the coefficient of friction ($\mu$) and the amount of graphite particles (Gr) of sliding materials containing 6% or 10% by weight of carbon black particles, a percentage of graphite particles (Gr) (indicated by the abscissa), 2% by weight of lubricating oil, and 4% by weight of PTFE, the balance being polyacetal resin.

Referring to FIG. 3, it is apparent that the graphite tend to decrease the coefficient of friction, and the grater such a tendency is, the smaller the amount of carbon black is.

Figure 4:
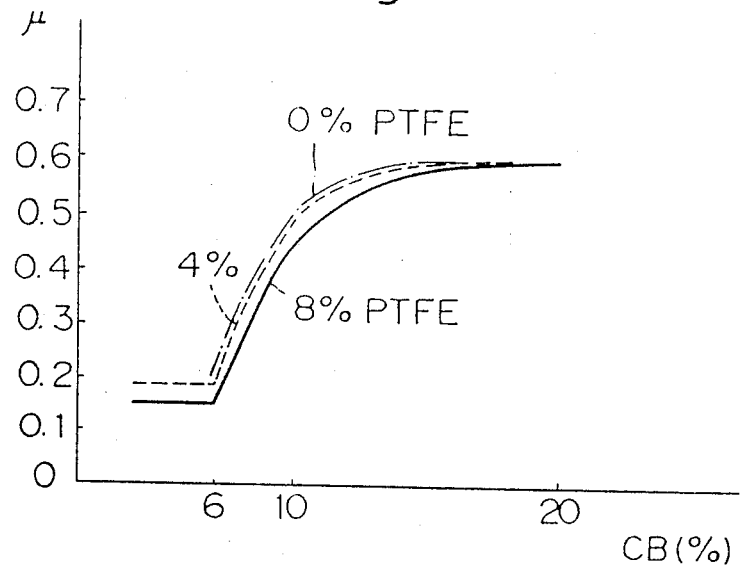
FIG. 4 shows the relationship between the coefficient of friction ($\mu$) and the amount of carbon black (CB) of sliding materials containing 20% by weight of graphite particles, 2.2% by weight of lubricating oil, 0.4% or 8% by weight of PTFE, and a percentage of carbon black particles (CB) (indicated by the abscissa), the balance being polyacetal resin.

Referring to FIG. 4, it is apparent that the PTFE tends to decrease the coefficient of friction (μ).

Figure 5:
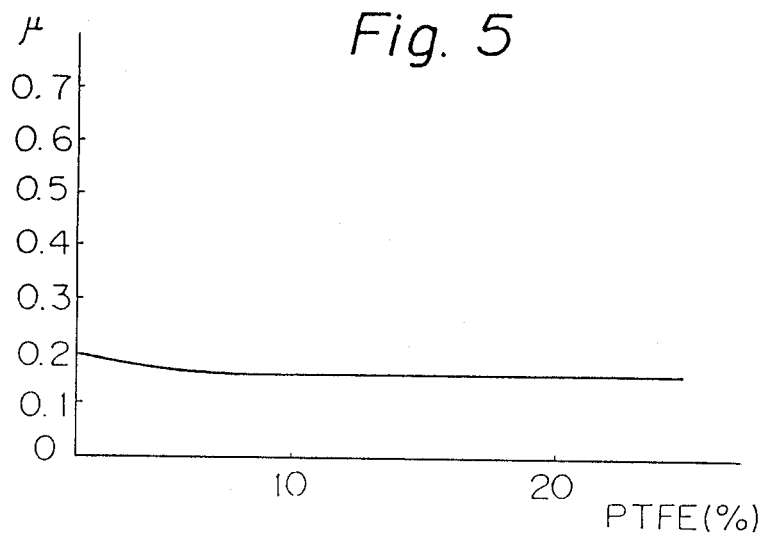
FIG. 5 shows the relationship between the coefficient of friction ($\mu$) and the amount of PTFE of sliding materials containing 6% by weight of carbon black particles, 20% by weight of graphite particles, 2% by weight of lubricating oil, and lubricating oil, and a percentage of PTFE (indicated by the abscissa), the balance being polyacetal resin.

Referring to FIG. 5, it is apparent that the coefficient of friction (μ) decreases with an increase in the amount of PTFE from 0 to 10% by weight and becomes substantially constant at an amount of PTFE of from more than 10% to 20% by weight.

Figure 6:
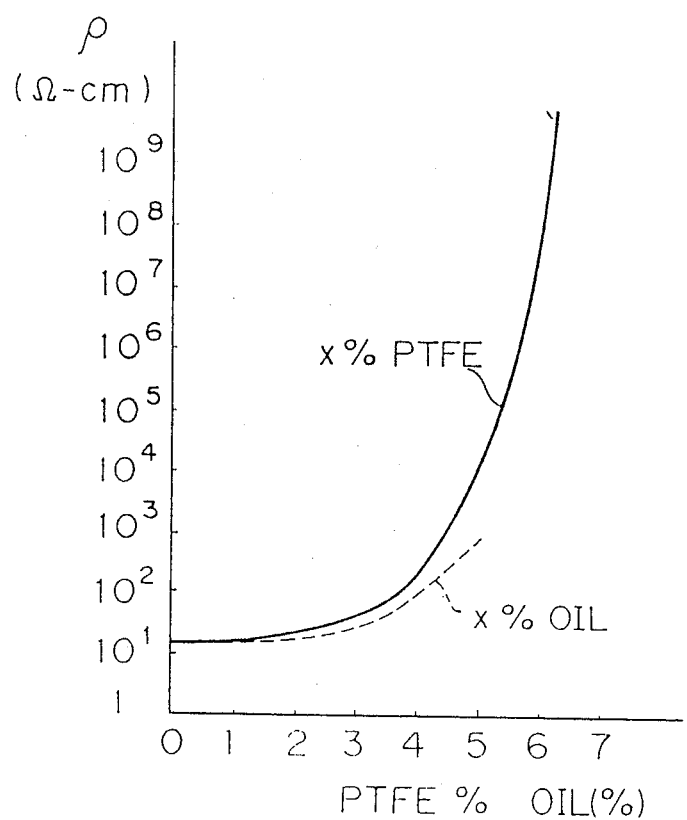
FIG. 6 shows the relationship between the coefficient of friction ($\mu$) and the amount of PTFE of sliding materials containing 6% by weight of carbon black particles, 2% by weight of lubricating oil, and a percentage of PTFE (indicated by the abscissa), the balance being polyacetal resin, and the relationship therebetween of sliding materials containing 6% by weight of carbon black particles, 4% by weight of PTFE, and a percentage of lubricating oil (OIL) (indicated by the abscissa), the balance being polyacetal resin.

Referring to FIG. 6, it is apparent that the volume resistivity (ρ) is abruptly increased at a PTFE content and a lubricating oil content of 4% by weight or more.

Figure 7:
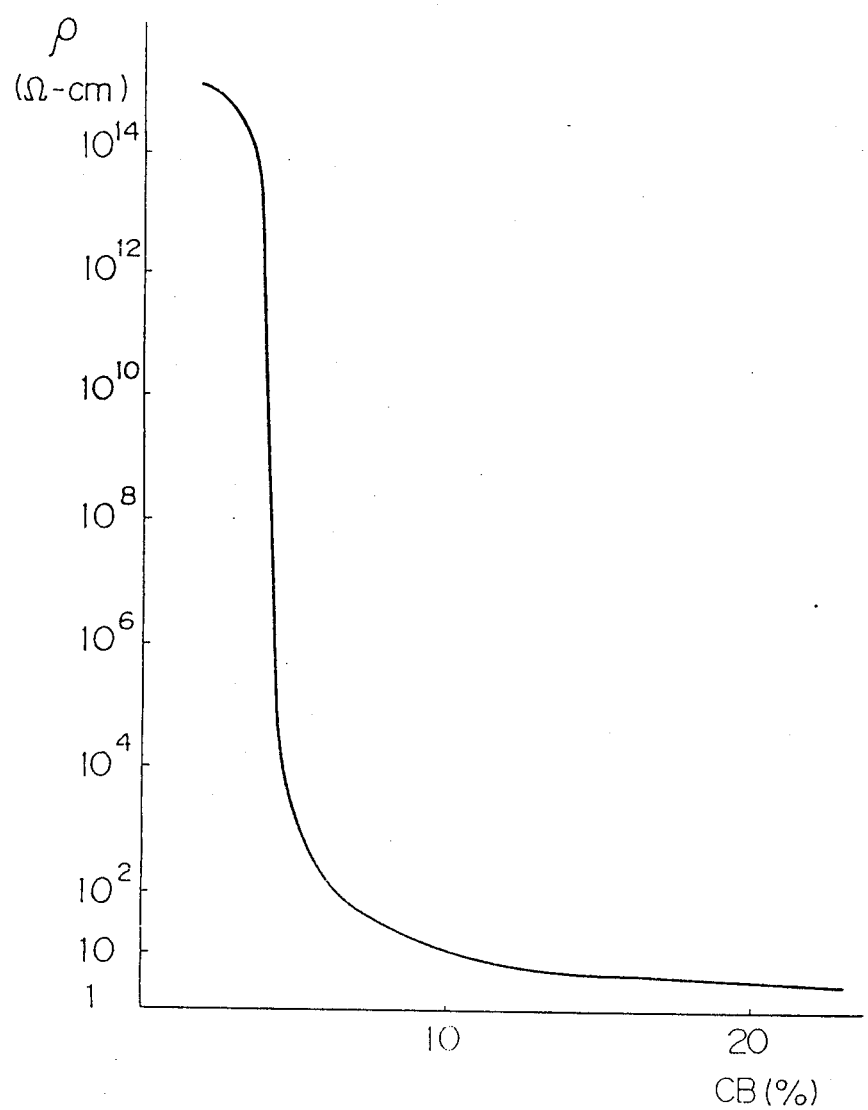
FIG. 7 shows the relationship between the volume resistivity (ρ) and the amount of carbon black particles (CB) of sliding materials containing 20% by weight of graphite, 2% by weight of lubricating oil, 4% by weight of PTFE, and a percentage of carbon black particles (CB) (indicated by the abscissa), the balance being polyacetal resin.

Referring to FIG. 7, it is apparent that the volume resistivity is abruptly decreased at approximately 5% by weight of the carbon black particles.

Figure 8:
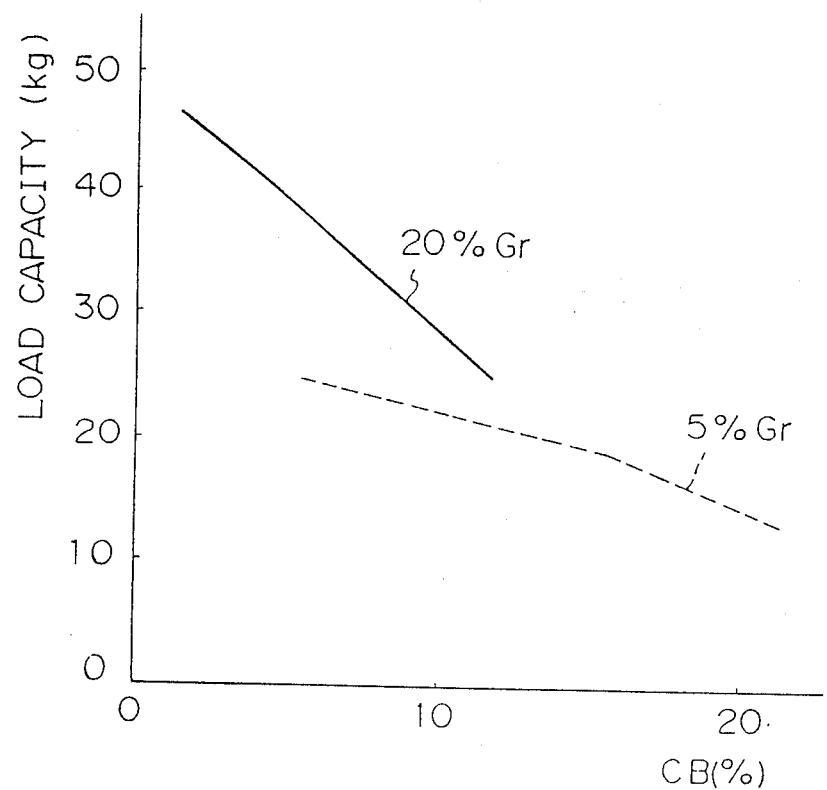
FIG. 8 shows the relationship between the load capacity and the amount of carbon black particles (CB) of sliding materials containing 20% or 5% by weight of graphite particles (Gr), 2% by weight of lubricating oil, 4% by weight of PTFE, and a percentage of carbon black particles (CB) (indicated by the abscissa), the balance being polyacetal resin.

The load capacity shown in FIG. 8 was measured under the following conditions:

A. Testing machine: a thrust-type friction wear tester
B. Sliding speed: 0.2 m/sec
C. Load: increased stepwise by 5 kg/hr
D. Opposite member: quenched SUJ-2
E. Lubrication: dry
F. Method for applying load: thrust load Referring to FIG. 8, it is apparent that the carbon black particles tend to lessen the load capacity, but such a tendency is mitigated by the graphite particles.

Figure 9:
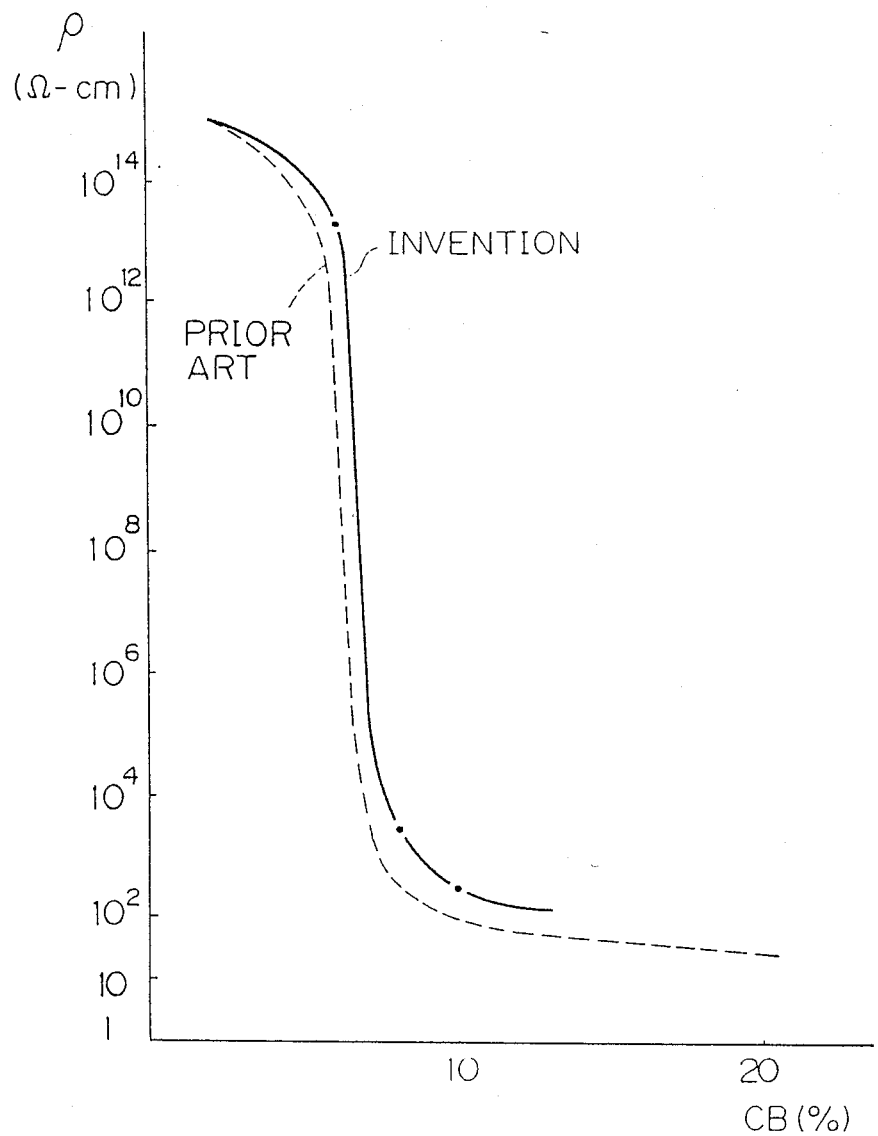
FIG. 9 shows the relationship between the volume resistivity (ρ) and the amount of carbon black particles (CB) of sliding materials containing carbon black particles and lubricating oil according to the present invention and the relationship therebetween of conventional conductive resin materials.

Referring to FIG. 9, the solid-line curve indicates the volume resistivity of the sliding materials according to the present invention containing 2% by weight of lubricating oil, 4% by weight of PTFE, and a percentage of carbon black (CB) (indicated by the abscissa), the balance being polyacetal resin. The broken-line curve indicates the volume resistivity of conventional conductive resin materials containing a percentage of carbon black particles (CB) (indicated by the abscissa).

It is apparent from FIG. 9 that the lubricating oil and the PTFE slightly lessen the electric conductivity, and, further, the volume resistivity decreases with an increase in the amount of carbon black particles.

Although the lubricating oil and PTFE are insulative, they do not make the sliding materials insulative.

As can be understood from the descriptions above, it is possible, by appropriately selecting the amount of components, to provide sliding materials which exhibit an electric conductivity equivalent to or superior to that of conventional conductive resin materials and which exhibit a lubricating property, a low coefficient, and a load capacity not attained by conventional conductive resin materials.

The representative properties of sliding materials containing graphite and carbon black are as follows.

Volume resistivity (ρ): $10^1$ Ω·cm
Coefficient of friction (μ): 0.3

The representative properties of sliding materials containing graphite, carbon black, and PTFE are as follows.

Volume resistivity (ρ): $10^2$ Ω·cm
Coefficient of friction (μ): 0.2

The representative properties of sliding materials containing graphite, carbon black, and lubricating oil are as follows.

Volume resistivity (ρ): $10^2$ Ω·cm
Coefficient of friction (μ): 0.5.

The representative properties of sliding materials containing graphite, carbon black, lubricating oil, and PTFE are as follows.

Volume resistivity (ρ): $10^2$ Ω·cm
Coefficient of friction (μ): 0.4.

The representative properties of conventional conductive resin materials containing only graphite are as follows.

Volume resistivity (ρ): $10^3 \sim 10^4$ Ω·cm
Coefficient of friction (μ): 0.7.

SLIDING MEMBER

A sliding member according to the present invention comprises an electric conductive body which is in slidable and electrical contact with an opposite body and which is electrically grounded, the electric conductive body consisting of one of the sliding materials according to the present invention.

An example of the sliding member is described with reference to FIGS. 10 and 11.

Figure 10:
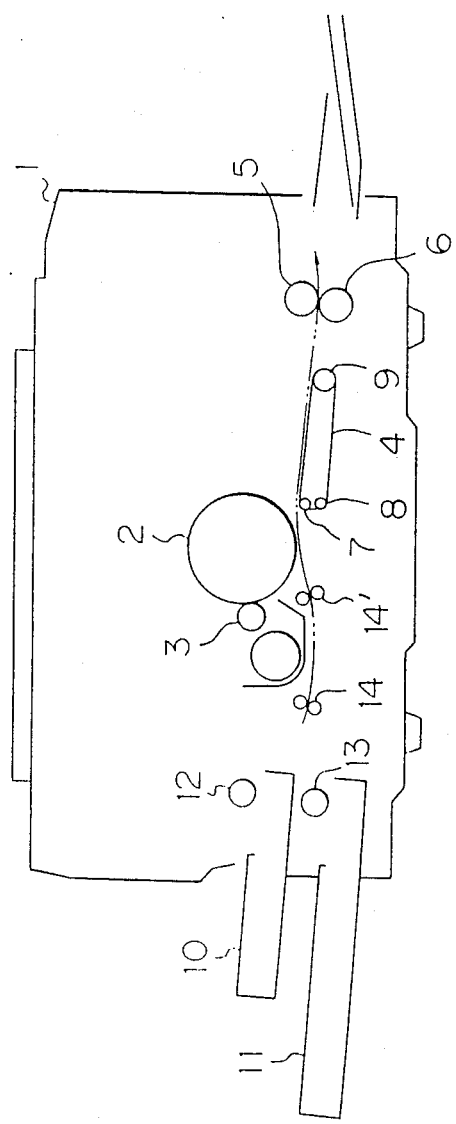
FIG. 10 is a schematic drawing of a copy machine.

Referring to FIG. 10, an electrostatic copy machine is denoted by reference numeral "1". The electrostatic copy machine shown in FIG. 10 is known per se and comprises a photosensitive body 2, a magnet roller 3, a suction belt 4, a pair of fixation rollers 5, 6, rotary shafts 7, 8, 9, around which the suction belt 4 is wound, paper reservoir cassettes 0, 11, paper-supplying rollers 12, 13, and two pairs of paper-feeding rollers 14, 14'.

Figure 11:
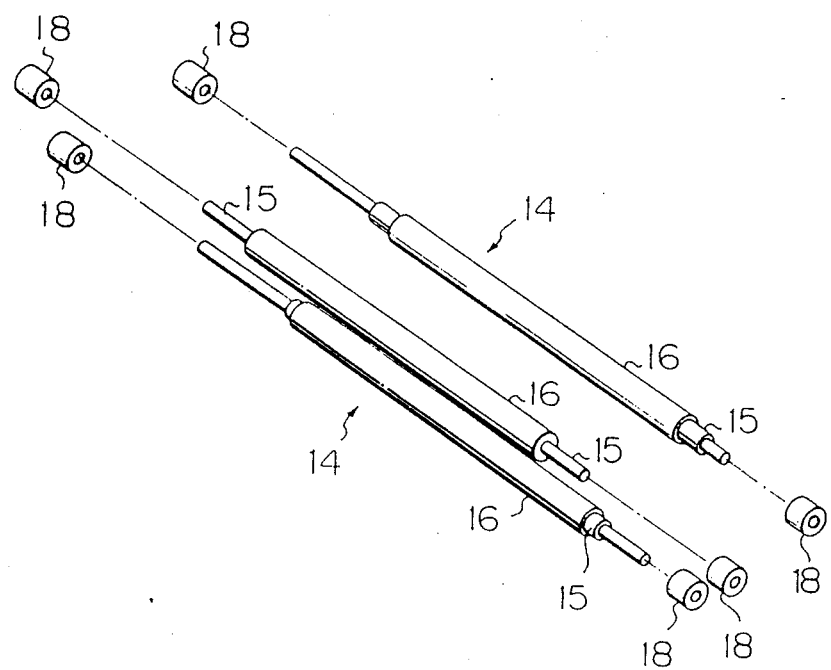
FIG. 11 shows the paper-feeding rollers of the copy machine shown in FIG. 10.

The three paper-feeding rollers 14 are shown in FIG. 11. The paper-feeding rollers 14 comprise a cylindrical steel shaft 15. The cylindrical shaft 15 is coated with a vinyl chloride coating 16 around the central part thereof. The ends of the paper feeding rollers 14 are smaller sized than the central part, are not covered by the vinyl chloride coating 16, and are directly supported by the bearings 18 in a sleeve form. The bearings 18 consist of one of the sliding materials according to the present invention and are grounded to the electrostatic copy machine 1 (FIG. 10). Therefore, the electric charges of the cylindrical steel shaft 15 can be conducted to the ground via the sliding bearings 18.

During the rotation of the paper-feeding rolls 14, the sliding bearings 18 exhibit a stable friction property and an improved wear resistance over a long operation time of the electrostatic copy machine 1. The electrostatic copy machine 1 therefore becomes very reliable while lessening the exchange of the sliding bearings 18. In addition, maintenance of the sliding bearings 18 is unnecessary, and the sliding bearings 18 can be small-sized due to an improved load capacity of the sliding materials.

In addition to the bearings as described above, other sliding members which are grounded or through which electricity is conducted can be manufactured using any sliding materials according to the present invention. Such sliding members can be used in VTRs, textile machines, and a pooley belt. Furthermore, a thrust bearing can be provided by the sliding materials according to the present invention can be used.

The shaft can be supported by both sliding and thrust bearings which are manufactured using any sliding material according to the present invention. In this case, one or both of the sliding and thrust bearings are grounded.

The shaft of a bearing can be made of metal resin material. The weight of the bearing structure can be reduced by using a resin shaft and current is conducted through the thrust shaft and thrust bearing. The sliding materials according to the present invention are appropriate for the thrust bearing since they exhibit a high load capacity. Even when the shaft, i.e., the opposite member of the sliding materials according to the present invention, is made of resin material, it is not scratched by the sliding materials.

The present invention is further described by way of examples.

EXAMPLE 1

Sliding materials having the compositions shown in Table 1 were prepared. In Table 1, POM: copolymer-type polyacetal, CB: carbon black particles (trade name: Ketchen Black), Gr: graphite particles (synthetized graphite particles of a standard G117 produced by Tokai Carbon), 4F: PTFE.

The mixture of POM and the like was kneaded, pelletized, and shaped into samples.

The wear amount was measured under the following conditions:
A. Testing machine: a thrust-type friction wear tester
B. Sliding speed: 0.2 m/sec
C. Load: 2.5 kg for the first 10 minutes and then 10 kg (constant)
D. Sliding length: 10 km
E. Opposite member: quenched SUJ-2
F. Lubrication: dry The testing conditions for obtaining the load capacity were the same as those described above.

TABLE 1

| No. | POM | CB | Gr | 4F | Volume Resistivity ($\Omega \cdot cm$) | Wear Amount (mg) | Coefficient of Friction ($\mu$) | Load Capacity (kg) |
| --- | --- | --- | --- | --- | --- | --- | --- | --- |
| 1 | rem | 2.0 | 20 | — | $2 \times 10^{12}$ | 8 | 0.24 | 30 |
| 2 | rem | 3.0 | 20 | — | $1 \times 10^{9}$ | 8 | 0.24 | 30 |
| 3 | rem | 3.1 | 20 | — | $7 \times 10^{8}$ | 8 | 0.24 | 30 |
| 4 | rem | 3.6 | 20 | — | $5 \times 10^{6}$ | 8 | 0.25 | 30 |
| 5 | rem | 4.1 | 20 | — | $2 \times 10^{3}$ | 9 | 0.25 | 30 |
| 6 | rem | 5.1 | 20 | — | $8 \times 10^{2}$ | 9 | 0.25 | 30 |
| 7 | rem | 5.6 | 20 | — | $6 \times 10^{1}$ | 9 | 0.26 | 30 |
| 8 | rem | 5.9 | 20 | — | $1.2 \times 10^{1}$ | 9 | 0.27 | 30 |
| 9 | rem | 7.1 | 20 | — | 9 | 10 | 0.29 | 30 |
| 10 | rem | 9.9 | 20 | — | 8 | 25 | 0.52 | 25 |
| 11 | rem | 14.9 | 8 | — | 8 | 100 | 0.59 | 20 |
| 12 | rem | 19.9 | 8 | — | 7 | 420 | 0.6 | 15 |
| 13 | rem | 29.8 | 8 | — | 7 | 440 | 0.6 | 15 |
| 14 | rem | 6 | 0.5 | — | $1 \times 10^{9}$ | 90 | 0.6 | 15 |
| 15 | rem | 6 | 2.1 | — | $8 \times 10^{7}$ | 20 | 0.6 | 15 |
| 16 | rem | 6 | 3.0 | — | $6 \times 10^{5}$ | 16 | 0.59 | 15 |
| 17 | rem | 6 | 3.1 | — | $8 \times 10^{4}$ | 15 | 0.58 | 20 |
| 18 | rem | 6 | 4.0 | — | $1 \times 10^{4}$ | 13 | 0.57 | 20 |
| 19 | rem | 6 | 5.1 | — | $3 \times 10^{3}$ | 12 | 0.56 | 20 |
| 20 | rem | 6 | 8.2 | — | $1 \times 10^{3}$ | 12 | 0.55 | 20 |
| 21 | rem | 6 | 10.1 | — | $4 \times 10^{2}$ | 11 | 0.50 | 20 |
| 22 | rem | 6 | 15.2 | — | $2 \times 10^{2}$ | 10 | 0.39 | 25 |
| 23 | rem | 6 | 16.6 | — | $8 \times 10^{1}$ | 10 | 0.37 | 25 |
| 24 | rem | 6 | 17.8 | — | $1.4 \times 10^{1}$ | 9 | 0.33 | 30 |
| 25 | rem | 6 | 19.8 | — | $1 \times 10^{1}$ | 9 | 0.27 | 30 |
| 26 | rem | 6 | 24.8 | — | 9 | 22 | 0.26 | 30 |
| 27 | rem | 6 | 29.6 | — | 9 | 80 | 0.25 | 30 |
| 28 | rem | 2.0 | 20 | 4 | $2 \times 10^{14}$ | 3.0 | 0.19 | 40 |
| 29 | rem | 3.0 | 20 | 4 | $5 \times 10^{12}$ | 3.5 | 0.19 | 40 |
| 30 | rem | 3.1 | 20 | 4 | $8 \times 10^{1}$ | 4.0 | 0.19 | 40 |
| 31 | rem | 3.6 | 20 | 4 | $2 \times 10^{8}$ | 4.5 | 0.20 | 35 |

TABLE 1-continued

| No. | POM | CB | Gr | 4F | Volume Resistivity ($\Omega \cdot cm$) | Wear Amount (mg) | Coefficient of Friction ($\mu$) | Load Capacity (kg) |
|---|---|---|---|---|---|---|---|---|
| 32 | rem | 4.1 | 20 | 4 | $8 \times 10^3$ | 5.0 | 0.20 | 35 |
| 33 | rem | 5.1 | 20 | 4 | $1.5 \times 10^2$ | 5.5 | 0.20 | 35 |
| 34 | rem | 5.6 | 20 | 4 | $2 \times 10^1$ | 6.0 | 0.21 | 35 |
| 35 | rem | 5.9 | 20 | 4 | $1.8 \times 10^1$ | 6.5 | 0.21 | 35 |
| 36 | rem | 7.1 | 20 | 4 | $1 \times 10^1$ | 7 | 0.25 | 30 |
| 37 | rem | 9.9 | 20 | 4 | $1 \times 10^1$ | 22 | 0.5 | 25 |
| 38 | rem | 14.9 | 5 | 4 | $1 \times 10^1$ | 85 | 0.6 | 20 |
| 39 | rem | 19.9 | 5 | 4 | $1 \times 10^1$ | 410 | 0.6 | 15 |
| 40 | rem | 29.8 | 5 | 4 | $1 \times 10^1$ | 430 | 0.6 | 15 |
| 41 | rem | 6 | 0.5 | 4 | $5 \times 10^9$ | 60 | 0.59 | 15 |
| 42 | rem | 6 | 2.1 | 4 | $2 \times 10^8$ | 4.5 | 0.58 | 20 |
| 43 | rem | 6 | 3.0 | 4 | $2 \times 10^6$ | 3.0 | 0.58 | 20 |
| 44 | rem | 6 | 3.1 | 4 | $1 \times 10^6$ | 2.8 | 0.57 | 20 |
| 45 | rem | 6 | 4.0 | 4 | $1 \times 10^5$ | 2.5 | 0.56 | 20 |
| 46 | rem | 6 | 5.1 | 4 | $8 \times 10^3$ | 2.4 | 0.55 | 25 |
| 47 | rem | 6 | 8.2 | 4 | $2 \times 10^3$ | 2.3 | 0.53 | 25 |
| 48 | rem | 6 | 10.1 | 4 | $8 \times 10^2$ | 2.2 | 0.42 | 25 |
| 49 | rem | 6 | 15.2 | 4 | $5 \times 10^2$ | 2.1 | 0.35 | 30 |
| 50 | rem | 6 | 16.6 | 4 | $1 \times 10^2$ | 2.1 | 0.30 | 30 |
| 51 | rem | 6 | 17.8 | 4 | $6 \times 10^1$ | 2.1 | 0.26 | 35 |
| 52 | rem | 6 | 19.8 | 4 | $1.4 \times 10^1$ | 2.0 | 0.22 | 35 |
| 53 | rem | 6 | 29.6 | 4 | $1 \times 10^1$ | 40 | 0.20 | 40 |
| 54 | rem | 6 | 20 | — | $1 \times 10^1$ | 2.6 | 0.27 | 30 |
| 55 | rem | 6 | 20 | 0.6 | $1.1 \times 10^1$ | 2.5 | 0.25 | 30 |
| 56 | rem | 6 | 20 | 1.1 | $1.1 \times 10^1$ | 2.4 | 0.24 | 30 |
| 57 | rem | 6 | 20 | 2.1 | $1.2 \times 10^1$ | 2.3 | 0.22 | 35 |
| 58 | rem | 6 | 20 | 2.6 | $1.2 \times 10^1$ | 2.1 | 0.21 | 35 |
| 59 | rem | 6 | 20 | 3.7 | $1.3 \times 10^1$ | 2.0 | 0.21 | 35 |
| 60 | rem | 6 | 20 | 3.9 | $1.4 \times 10^1$ | 2.0 | 0.21 | 35 |
| 61 | rem | 6 | 20 | 4.9 | $2 \times 10^3$ | 1.7 | 0.19 | 40 |
| 62 | rem | 6 | 20 | 6.9 | $5 \times 10^5$ | 1.8 | 0.18 | 40 |
| 63 | rem | 8 | 10 | 9.7 | $5 \times 10^3$ | 2.0 | 0.20 | 45 |
| 64 | rem | 8 | 10 | 11.0 | $8 \times 10^4$ | 3.0 | 0.19 | 45 |
| 65 | rem | 8 | 10 | 14.5 | $2 \times 10^7$ | 12 | 0.18 | 50 |
| 66 | rem | 8 | 10 | 19.9 | $5 \times 10^{10}$ | 55 | 0.18 | 50 |
| 67 | rem | 8 | 10 | 22.0 | $8 \times 10^{13}$ | 110 | 0.18 | 50 |

Sample Nos. 9, 10, 24, 25, 26, 34, 35, 36, and 52 through 60 had both particularly good sliding characteristics and a particularly high electric conductivity.

Instead of POM, polyimide was used. In this case, virtually the same properties as those in Table 1 were obtained.

EXAMPLE 2

Sliding materials having the compositions shown in Table 2 were prepared by the same procedure as in Example 1. OIL (Gr) in Table 2 indicates jet engine oil, a part of which was impregnated into the graphite particles.

TABLE 2

| No. | POM | CB | Gr | OIL (Gr) | 4F | Volume Resistivity ($\Omega \cdot cm$) | Wear Amount (mg) | Coefficient of Friction ($\mu$) | Load Capacity (kg) |
|---|---|---|---|---|---|---|---|---|---|
| 68 | rem | 2.0 | 20 | 2.2 | 4 | $3 \times 10^{14}$ | 1.6 | 0.19 | 45 |
| 69 | rem | 3.0 | 20 | 2.2 | 4 | $9 \times 10^{12}$ | 1.7 | 0.19 | 45 |
| 70 | rem | 3.1 | 20 | 2.2 | 4 | $9 \times 10^{12}$ | 1.7 | 0.19 | 40 |
| 71 | rem | 3.6 | 20 | 2.2 | 4 | $7 \times 10^8$ | 1.8 | 0.20 | 40 |
| 72 | rem | 4.1 | 20 | 2.2 | 4 | $3 \times 10^4$ | 1.8 | 0.20 | 40 |
| 73 | rem | 5.1 | 20 | 2.2 | 4 | $5 \times 10^2$ | 1.8 | 0.20 | 40 |
| 74 | rem | 5.6 | 20 | 2.2 | 4 | $3 \times 10^1$ | 1.8 | 0.20 | 40 |
| 75 | rem | 5.9 | 20 | 2.2 | 4 | $2 \times 10^1$ | 1.8 | 0.20 | 40 |
| 76 | rem | 7.1 | 20 | 2.2 | 4 | $1 \times 10^1$ | 5 | 0.24 | 35 |
| 77 | rem | 9.9 | 20 | 2.2 | 4 | $1 \times 10^1$ | 20 | 0.5 | 25 |
| 78 | rem | 14.9 | 5 | 2.2 | 4 | $1 \times 10^1$ | 25 | 0.6 | 20 |
| 79 | rem | 19.9 | 5 | 2.2 | 4 | $1 \times 10^1$ | 400 | 0.6 | 10 |
| 80 | rem | 6 | 2 | 2.2 | 4 | $4 \times 10^8$ | 5.2 | 0.6 | 25 |
| 81 | rem | 6 | 3.0 | 2.2 | 4 | $3 \times 10^6$ | 5.2 | 0.6 | 25 |
| 82 | rem | 6 | 3.1 | 2.2 | 4 | $2 \times 10^6$ | 5.2 | 0.6 | 25 |
| 83 | rem | 6 | 4.0 | 2.2 | 4 | $2 \times 10^5$ | 5.1 | 0.6 | 25 |
| 84 | rem | 6 | 5.1 | 2.2 | 4 | $9 \times 10^4$ | 5.0 | 0.55 | 25 |
| 85 | rem | 6 | 8.2 | 2.2 | 4 | $3 \times 10^4$ | 5.0 | 0.55 | 30 |
| 86 | rem | 6 | 10.1 | 2.2 | 4 | $6 \times 10^3$ | 4.8 | 0.42 | 30 |
| 87 | rem | 6 | 15.2 | 2.2 | 4 | $7 \times 10^2$ | 4.1 | 0.34 | 35 |
| 88 | rem | 6 | 16.6 | 2.2 | 4 | $2 \times 10^2$ | 3.8 | 0.28 | 35 |
| 89 | rem | 6 | 17.8 | 2.2 | 4 | $7 \times 10^1$ | 2.7 | 0.24 | 35 |
| 90 | rem | 6 | 19.8 | 2.2 | 4 | $2 \times 10^1$ | 1.8 | 0.20 | 40 |
| 91 | rem | 6 | 20 | 0.1 | 4 | $1 \times 10^1$ | 2.1 | 0.20 | 35 |
| 92 | rem | 6 | 20 | 0.6 | 4 | $1.5 \times 10^1$ | 1.9 | 0.20 | 35 |
| 93 | rem | 6 | 20 | 1.6 | 4 | $1.5 \times 10^1$ | 1.9 | 0.19 | 35 |
| 94 | rem | 6 | 20 | 1.9 | 4 | $2 \times 10^1$ | 1.9 | 0.19 | 40 |

TABLE 2-continued

| No. | POM | CB | Gr | OIL (Gr) | 4F | Volume Resistivity ($\Omega \cdot cm$) | Wear Amount (mg) | Coefficient of Friction ($\mu$) | Load Capacity (kg) |
|---|---|---|---|---|---|---|---|---|---|
| 95 | rem | 6 | 20 | 2.0 | 4 | $2 \times 10^1$ | 1.8 | 0.19 | 40 |
| 96 | rem | 6 | 20 | 2.2 | 4 | $2 \times 10^1$ | 1.8 | 0.19 | 40 |
| 97 | rem | 6 | 20 | 2.4 | 4 | $3 \times 10^1$ | 1.9 | 0.18 | 40 |
| 98 | rem | 6 | 20 | 2.8 | 4 | $7 \times 10^1$ | 2.4 | 0.18 | 45 |
| 99 | rem | 6 | 20 | 3.3 | 4 | $3 \times 10^2$ | 3.7 | 0.18 | 45 |
| 100 | rem | 6 | 20 | 3.9 | 4 | $7 \times 10^2$ | 5.2 | 0.18 | 50 |
| 101 | rem | 6 | 20 | 4.4 | 4 | $1 \times 10^3$ | 7.7 | 0.18 | 50 |
| 102 | rem | 6 | 20 | 4.8 | 4 | $5 \times 10^3$ | 18.2 | 0.18 | 40 |
| 103 | rem | 6 | 20 | 8.9 | 4 | $6 \times 10^4$ | 30 | 0.32 | 30 |
| 104 | rem | 6 | 20 | 9.9 | 4 | $1 \times 10^{12}$ | 62 | 0.40 | 20 |
| 105 | rem | 6 | 20 | 12.0 | 4 | $1 \times 10^{14}$ | 125.25 | 0.47 | 20 |
| 106 | rem | 6 | 20 | 2 | 3.9 | $5 \times 10^2$ | 1.8 | 0.18 | 40 |
| 107 | rem | 6 | 20 | 2 | 4.7 | $1.9 \times 10^3$ | 1.8 | 0.17 | 45 |
| 108 | rem | 6 | 20 | 2 | 4.9 | $2.3 \times 10^3$ | 1.8 | 0.17 | 45 |
| 109 | rem | 6 | 20 | 2 | 5.4 | $3 \times 10^4$ | 1.7 | 0.17 | 45 |
| 110 | rem | 6 | 20 | 2 | 5.8 | $5 \times 10^8$ | 1.7 | 0.16 | 45 |
| 111 | rem | 6 | 20 | 2 | 6.9 | $1 \times 10^{14}$ | 1.7 | 0.16 | 45 |
| 112 | rem | 6 | 20 | 2 | 8.0 | $1 \times 10^{14}$ | 1.6 | 0.15 | 50 |
| 113 | rem | 6 | 20 | 2 | 9.7 | $1 \times 10^{14}$ | 1.6 | 0.15 | 50 |
| 114 | rem | 6 | 20 | 2 | 11.0 | $1 \times 10^{14}$ | 1.6 | 0.15 | 50 |
| 115 | rem | 6 | 20 | 2 | 14.5 | $1 \times 10^{14}$ | 1.5 | 0.14 | 55 |
| 116 | rem | 6 | 20 | 2 | 17.8 | $1 \times 10^{14}$ | 1.5 | 0.14 | 55 |
| 117 | rem | 6 | 20 | 2 | 19.9 | $1 \times 10^{14}$ | 1.5 | 0.14 | 55 |
| 118 | rem | 6 | 20 | 2 | 22.0 | $1 \times 10^{14}$ | 1.5 | 0.14 | 55 |

Sample Nos. 74, 75, 76, and 90 through 97 had both particularly good sliding characteristics and a high electric conductivity.

Instead of POM, polyimide was used. In this case, virtually the same properties as those in Table 1 were obtained.

EXAMPLE 3

Sliding materials having the compositions shown in Table 3 were prepared by the same procedure as in Example 1. OIL (Gr) in Table 3 indicates jet engine oil, a part of which was impregnated into the graphite particles.

TABLE 3

| No. | POM | CB | OIL (Gr) | 4F | Volume Resistivity ($\Omega \cdot cm$) | Coefficient of Friction ($\mu$) | Load Capacity (kg) |
|---|---|---|---|---|---|---|---|
| 119 | rem | 2.0 | 2 | 4 | $10^{14}$ or more | 0.3 | 35 |
| 120 | rem | 3.0 | 2 | 4 | $1 \times 10^{14}$ | 0.3 | 30 |
| 121 | rem | 3.1 | 2 | 4 | $1 \times 10^{14}$ | 0.35 | 30 |
| 122 | rem | 4.1 | 2 | 4 | $2 \times 10^{13}$ | 0.35 | 30 |
| 123 | rem | 5.1 | 2 | 4 | $2 \times 10^{12}$ | 0.35 | 30 |
| 124 | rem | 5.6 | 2 | 4 | $3 \times 10^{11}$ | 0.40 | 30 |
| 125 | rem | 5.9 | 2 | 4 | $1 \times 10^5$ | 0.4 | 30 |
| 126 | rem | 7.1 | 2 | 4 | $3 \times 10^4$ | 0.4 | 30 |
| 127 | rem | 9.9 | 2 | 4 | $1 \times 10^3$ | 0.45 | 25 |
| 128 | rem | 14.9 | 2 | 4 | $1 \times 10^2$ | 0.5 | 25 |
| 129 | rem | 19.9 | 2 | 4 | $1 \times 10^2$ | 0.5 | 20 |
| 130 | rem | 24.8 | 2 | 4 | 1 | 0.6 | 15 |
| 131 | rem | 29.9 | 2 | 4 | 1 | 0.6 | 15 |
| 132 | rem | 6 | 0 | 4 | $10^{11}$ | 0.4 | 30 |
| 133 | rem | 6 | 0.1 | 4 | $10^{11}$ | 0.4 | 30 |
| 134 | rem | 6 | 0.6 | 4 | $10^{11}$ | 0.4 | 30 |
| 135 | rem | 6 | 1.6 | 4 | $10^{11}$ | 0.4 | 30 |
| 136 | rem | 6 | 1.9 | 4 | $2 \times 10^{11}$ | 0.4 | 30 |
| 137 | rem | 6 | 2.0 | 4 | $1 \times 10^{11}$ | 0.4 | 30 |
| 138 | rem | 6 | 2.2 | 4 | $2 \times 10^{12}$ | 0.4 | 30 |
| 139 | rem | 6 | 2.4 | 4 | $3 \times 10^{13}$ | 0.4 | 30 |
| 140 | rem | 6 | 2.8 | 4 | $1 \times 10^{14}$ | 0.35 | 35 |
| 141 | rem | 6 | 3.3 | 4 | $2 \times 10^{14}$ | 0.35 | 35 |
| 142 | rem | 6 | 3.9 | 4 | $3 \times 10^{14}$ | 0.35 | 35 |
| 143 | rem | 6 | 4.4 | 4 | $10^{14}$ | 0.35 | 35 |
| 144 | rem | 6 | 4.8 | 4 | $10^{14}$ | 0.35 | 35 |
| 145 | rem | 6 | 7.7 | 4 | $10^{14}$ | 0.3 | 40 |
| 146 | rem | 6 | 9.9 | 4 | $10^{14}$ | 0.3 | 40 |
| 147 | rem | 6 | 12.0 | 4 | $10^{14}$ or more | 0.3 | 40 |
| 148 | rem | 8 | 1.6 | 4 | $10^{11}$ | 0.4 | 30 |
| 149 | rem | 8 | 2.0 | 4 | $10^{11}$ | 0.4 | 30 |
| 150 | rem | 8 | 2.2 | 4 | $10^{12}$ | 0.4 | 30 |
| 151 | rem | 8 | 2.8 | 4 | $10^{13}$ | 0.35 | 30 |
| 152 | rem | 8 | 3.3 | 4 | $10^{13}$ | 0.35 | 35 |
| 153 | rem | 8 | 4.8 | 4 | $10^{14}$ | 0.35 | 35 |
| 154 | rem | 6 | 2 | 0 | $\times 10^9$ | 0.6 | 25 |
| 155 | rem | 6 | 2 | 0.6 | $\times 10^{10}$ | 0.55 | 25 |
| 156 | rem | 6 | 2 | 1.0 | $\times 10^{11}$ | 0.55 | 30 |
| 157 | rem | 6 | 2 | 1.2 | $\times 10^{11}$ | 0.5 | 30 |

TABLE 3-continued

| No. | POM | CB | OIL (Gr) | 4F | Volume Resistivity ($\Omega \cdot cm$) | Coefficient of Friction ($\mu$) | Load Capacity (kg) |
| --- | --- | --- | --- | --- | --- | --- | --- |
| 158 | rem | 6 | 2 | 2.1 | $\times 10^{11}$ | 0.5 | 30 |
| 159 | rem | 6 | 2 | 3.1 | $\times 10^{11}$ | 0.5 | 30 |
| 160 | rem | 6 | 2 | 3.7 | $\times 10^{11}$ | 0.45 | 30 |
| 161 | rem | 6 | 2 | 3.9 | $\times 10^{11}$ | 0.4 | 30 |
| 162 | rem | 6 | 2 | 4.7 | $\times 10^{12}$ | 0.4 | 30 |
| 163 | rem | 6 | 2 | 4.9 | $\times 10^{12}$ | 0.4 | 30 |
| 164 | rem | 6 | 2 | 5.4 | $\times 10^{13}$ | 0.35 | 35 |
| 165 | rem | 6 | 2 | 5.8 | $\times 10^{13}$ | 0.35 | 35 |
| 166 | rem | 6 | 2 | 6.9 | $\times 10^{13}$ | 0.35 | 35 |
| 167 | rem | 6 | 2 | 8.0 | $\times 10^{13}$ | 0.30 | 35 |
| 168 | rem | 6 | 2 | 9.7 | $\times 10^{14}$ | 0.30 | 35 |
| 169 | rem | 6 | 2 | 11.0 | $\times 10^{14}$ | 0.30 | 40 |
| 170 | rem | 6 | 2 | 14.5 | $\times 10^{14}$ | 0.25 | 40 |
| 171 | rem | 6 | 2 | 17.8 | $\times 10^{14}$ | 0.25 | 40 |
| 172 | rem | 6 | 2 | 19.9 | $\times 10^{14}$ | 0.25 | 40 |
| 173 | rem | 6 | 2 | 22.0 | $\times 10^{14}$ | 0.25 | 40 |

As is apparent from Table 3, the volume resistivity varies from $10^0$ to $10^{14}$ $\Omega \cdot cm$, the coefficient of friction ($\mu$) varies from 0.3 to 0.6, and the load capacity varies from 25 to 40 kg.

The sliding characteristics represented by the coefficient of friction ($\mu$) and the load capacity in Table 3 generally are not as excellent as are those in Tables 1 and 2. However, due to the presence of the lubricating oil, the samples in Table 3 have a good and stable sliding property.

Sample Nos. 145, 146, 147, and 169 through 173 had particularly good sliding characteristics.

Sample Nos. 130 and 131 had a particularly high electric conductivity.

Sample Nos. 127, 128, and 129 had both good sliding characteristics and a high electric conductivity.

We claim:

1. A conductive and sliding resin material having an improved electric conductivity and improved sliding characteristics and consisting of (A) a thermoplastic resin selected from the group consisting of polyphenylene oxide, polyphenylene sulfide, polybutylenephthalate, polyamide, polycarbonate and polyacetal, (B) 3 to 10% by weight of carbon black and (c) 15 to 40% by weight of graphite.

2. A conductive and sliding resin material according to claim 1, wherein the amount of carbon black is from 7 to 10% by weight.

3. A conductive and sliding resin material according to claim 1, wherein said graphite is selected from the group consisting of natural graphite and synthetic graphite.

4. A conductive and sliding resin material according to claim 1, wherein said graphite is synthetic graphite.

5. A conductive and sliding resin material according to claim 1, wherein said carbon black is in the form of ultrafine particles 10 Å or less in size.

* * * * *